United States Patent
Hagiwara

(10) Patent No.: US 9,335,508 B2
(45) Date of Patent: May 10, 2016

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kazuyoshi Hagiwara, Kanagawa (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY. CO., LTD., Huizhou (CN)

( * ) Notice: Subject to any disclaimer, the term of this patent is extended or adjusted under 35 U.S.C. 154(b) by 0 days.

(21) Appl. No.: 14/569,736

(22) Filed: Dec. 14, 2014

(65) Prior Publication Data
US 2015/0177478 A1    Jun. 25, 2015

(30) Foreign Application Priority Data
Dec. 19, 2013    (JP) ................................. 2013-262924

(51) Int. Cl.
G02B 7/02    (2006.01)
G02B 7/09    (2006.01)
G03B 3/10    (2006.01)
G02B 7/08    (2006.01)
H02K 41/02    (2006.01)

(52) U.S. Cl.
CPC .. G02B 7/09 (2013.01); G02B 7/08 (2013.01); G03B 3/10 (2013.01); H02K 41/02 (2013.01)

(58) Field of Classification Search
CPC ............ H02K 41/02; G02B 7/08; G02B 7/09; G03B 3/10
USPC .......... 359/824, 825, 826, 818, 819, 811, 642
See application file for complete search history.

(56) References Cited

U.S. PATENT DOCUMENTS 7,880,983 B2 *  2/2011  Hagiwara ................ G02B 7/08
                                                  359/819

* cited by examiner

Primary Examiner — Tuyen Tra
(74) Attorney, Agent, or Firm — Hemisphere Law, PLLC

(57) ABSTRACT

The present invention provides a lens driving device which does not cause a large size or has no need to add components. Damage of components for limiting the amount of movement in all directions caused by impact can be alleviated, and durability is easily improved. Clamping parts protruding from a lens support for alleviating the impact in the vertical, plane, and rotation directions are arranged between a lower side fixing body and an upper side fixing body, and the clamping parts of the lens support abut with clamping parts arranged on a lower side fixed member and/or clamping parts arranged on an upper fixed member mutually so as to limit the maximum amount of movement in the vertical direction, the plane direction and the rotation direction, thus great change is not required for an existing structure, and the durability for impact can also be improved.

8 Claims, 15 Drawing Sheets

LENS DRIVING DEVICE

BACKGROUND OF THE INVENTION

1. Field of the Invention

The present invention relates to a lens driving device, in particular to a lens driving device with plate springs for elastically supporting a lens support for retaining a lens.

2. Description of Related Art

In recent years, in mobile telephones, a camera mounted in a smartphone (multifunctional mobile telephone) or a tablet device not only has high pixel but also mostly includes an auto focus device. As shown in FIG. 16, as a lens driving manner with the auto focus device, the lens driving device using a voice coil motor is widely adopted.

As shown in FIG. 16 to FIG. 21, the lens driving device using the voice coil motor includes a lens support 3, a driving coil 4, a lower spring 2, an upper spring 7, a square magnet yoke 9 and a plurality of magnets 6. The central part of the lens support 3 forms a thread part 3d for retaining the lens (unshown in figures). The driving coil 4 is mounted on the lens support 3. The lower spring 2 and the upper spring 7 are respectively mounted on the lens support 3 and are used for supporting the lens support 3 from the lower side and the upper side. The square magnet yoke 9 is mounted around the lens support 3, and is composed of magnetic substances such as soft iron serving as an outer side metal cover. The magnets 6 are mounted on the magnet yoke 9, and the outer circumferences of the magnets 6 are shaped to conform (cooperate) to the shape of the inner wall of the magnet yoke 9, and the inner circumferences of the magnets 6 are shaped to cooperate to the shape of the outer circumference of the driving coil 4.

An outline part 2d of the lower spring 2 is shaped to be corresponding to a plate spring outline retaining part 1d of a lower side fixing body 1, and the lower spring 2 is mounted on the lower side fixing body 1. An outline part 7d of the upper spring 7 is shaped to be corresponding to a plate spring outline retaining part 8d of an upper side fixing body 8 mounted on the magnet yoke 9, and the upper spring 7 is mounted on the upper side fixing body 8. An inner ring part 7e of the upper spring 7 is shaped to be cooperating to the upper surface of the lens support 3.

A plurality of guiding parts 1b are arranged at the four corners of the lower side fixing body 1. The guiding parts 1b abut against a plurality of guiding parts 8b at the four corners of the upper side fixing body 8, and thus the height of the lens driving device is determined.

The driving coil 4 is arranged in a magnetic field generated by the magnet yoke 9 and the magnets 6 and distributed around the driving coil 4 radially. Therefore, an arrow as shown in FIG. 17, with the driving coil 4 is electrified, the driving coil 4 generates a Lorentz force towards the directions extending along a object to be shot (upper direction and lower direction). Under the action of the Lorentz force, the driving coil 4 moves the lens support 3 to a preset position balanced with restoring force of the lower spring 2 and the upper spring 7.

Therefore, the lens driving device as shown in FIG. 16 controls the amount of movement of the lens support 3 by adjusting the amount of current flowing into the driving coil 4, thus the position of the lens (unshown in figures) can be controlled freely.

Moreover, as shown in FIG. 16 to FIG. 19, a plurality of guiding parts 7a of the upper spring 7 are engaged with a plurality of front end clamping parts 3a of the lens support 3 so as to determine the rotation direction of the lens support 3.

A plurality of bending parts 9a are arranged in the magnet yoke 9 and are taken as clamping mechanisms for limiting the amounts of movement in the vertical direction. The bending parts 9a are inserted between the recessed outside wall part (clamping part in the side face direction) 3e of the lens support 3 and the inner side of the driving coil 4. A plurality of clamping parts 3f are arranged near the lower side mounting position of the driving coil 4, namely the inner side of the driving coil 4.

The clamping parts 3f of the lens support 3 control the amount of movement of the lens by utilizing lower end faces 9c of the magnet yoke 9. The lower end faces 9c of the magnet yoke 9 and the clamping parts 3f of the lens support 3 are partitioned at an interval C when the magnet yoke 9 is not driven, and the magnet yoke 9 abuts against the clamping parts 3f of the lens support 3 when the magnet yoke 9 is driven. That is to say, when the magnet yoke 9 is driven, a plurality of the side faces 9b are used for limiting the interval C as the maximum amount of movement to be zero, and so as to prevent the lens driving device from moving.

In addition, in recent years, with the development of high pixelate of the cameras, in order to solve the problems such as the lens driving device is influenced by falling impact and the characteristics of the lens driving device cannot be functioned, a solution that adding a clamping mechanism to the lens driving device for limiting the amount of movement in the plane direction or the rotation direction is proposed.

For example, as shown in FIG. 16 and FIG. 20, the bending pats 9a of the magnet yoke 9 formed by base materials such as high-strength soft iron are used as the clamping mechanisms in the plane direction. Specifically, when the lens driving device is not driven, the bending parts 9a formed in the inner circumference side of the magnet yoke 9 and extending towards the lower side and the recessed outside wall part (clamping part in the side face direction) 3e of the lens support 3 are mutually partitioned at an interval (maximum amount of movement) E. Moreover, when the lens driving device is driven the bending parts 9a and the recessed outside wall part 3e abut against together, and thus the movement in the plane direction is limited (the state that the interval E is zero is formed so that the lens driving device does not move).

In addition, the existing lens driving device also includes a clamping mechanism in the rotation device. The amount of movement in the rotation direction is limited by the clamping mechanism in the rotation direction, so that the spring components cannot be damaged under the effect of a large torque.

For example, when the lens driving device as shown in FIG. 16 and FIG. 21 is not driven, a maximum amount of rotation F in clockwise direction and in anticlockwise direction is formed between the side faces 9b in the bending parts 9a of the magnet yoke 9 and the guiding parts 3b of the lens support 3 extending towards the outer circumference side. Moreover, with the driving of the lens driving device, the side faces 9b of the magnet yoke 9 abut against a plurality of clamping parts 3c of the lens support 3. The spring components are limited to the maximum amount of rotation F, so that micro deformation such as extending or bending cannot occur in the spring components under the effect of rotation torque generated when the lens is screwed in.

In order to prevent hysteresis caused by mutual contact among components of the lens driving device using the voice coil motor, the upper spring 7 and the lower spring 2 are utilized for connecting the upper part and the lower part of the lens support 3. Thus, after the lens support 3 moves and begins to float, before the lens support 3 moves the interval (maximum amount of movement) C, the interval between the lens support 3 and all components is retained, and the lens support 3 is not in contact with other components.

However, under the condition that the impact in the vertical direction is applied to the lens driving device due to falling, the clamping parts 3f of the lens support 3 as the clamping mechanism in the vertical direction sometimes collide with the lower end faces 9c of the magnet yoke 9, the clamping parts 3f are damaged, or the driving coil 4 is fallen off by the impact, or the impact is transferred to the connected lower spring 2 or upper spring 7 and the lower spring 2 or the upper spring 7 generates micro deformation, and thus the characteristics and functions of the lens driving device cannot be developed.

In addition, under the impact in the plane direction, the recessed outside wall part 3e of the lens support 3 as the clamping mechanism in the plane direction sometimes collides with the bending parts 9a of the magnet yoke 9, which may cause stress of the recessed outside wall part 3e, damage to welds as resin jointing parts and falling of the driving coil 4, or micro deformation of the connected lower spring 2 or upper spring 7 for the impact is transferred to the connected lower spring 2 or upper spring 7, and thus the effects of characteristics and functions of the lens driving device cannot be developed.

And then, the condition that the lens support 3 rotates sharply in the direction of the falling impact further appears. For example, under the condition that the impact in the rotation direction is applied, the clamping parts 3c of the lens support 3 as the clamping mechanism in the rotation direction collide with the side faces 9b of the magnet yoke 9 when the lens is screwed in, the clamping parts 3c are damaged by pressing or grinding, and thus the impact is transferred to the connected lower spring 2 or upper spring 7 to generate micro deformation, or garbage is generated at the interior and falls to the inside of the lens driving device, so that characteristics and functions of the lens driving device cannot be developed.

A method for alleviating the impact in the vertical direction applied on the lens driving device is disclosed in Patent Literature 1 (JP 2006-251728), and a plurality of elastic projections are arranged near a plurality of clamping parts 8a of the upper side fixing body 8. The projections are made of common liquid crystal polymer used in the lens driving device. And in order to obtain sufficient elastic force, sufficient length of the lens driving device needs to be ensured. However, under the condition that the size of the lens driving device in the vertical direction is kept shorter, the thickness is thinned and the elastic force is obtained, and problems exist in the view of strength or deformation. In order to enable the projections arranged on the lens driving device in the patent literature to obtain sufficient elastic force, the size of the lens driving device needs to be prolonged along the vertical direction.

And then, as disclosed in the Patent Literature 1, in order to shelter from the garbage, almost all lens driving devices are formed into the structures that the magnet yoke 9 is disposed on the outermost side, but a compact shock absorber structure is difficult to mount on the inside of the magnet yoke 9.

In addition, in order to adapt for the high pixel, the lens driving device uses a lens with larger lens diameter compared with a former lens driving device or increase the piece number of lens of a laminated lens with increased (for example, former three lenses are increased to four lenses, or former four lenses are increased to five lenses). Therefore, the weight of the laminated lens is increased with the increase of the piece number of lenses or the enlargement of the lens diameter, and the weight of the lens driving device is also increased, and thus the impact to the lens driving device is also increased. In order to cope with the increased impact force along with the increase of weight, the thickness of the clamping part 8a as the clamping mechanism in the vertical direction or the recessed outside wall part 3e of the lens support 3 as the clamping mechanism in the plane direction is increased so as to improve the strength, or the thickness of the bending parts 9a is increased so as to increase the contact area between the clamping parts 3c of the lens support 3 as the clamping mechanism in the rotation direction and the side faces 9b of the magnet yoke 9, and thus barrier to miniaturization of the lens driving device is reduced.

Moreover, under the condition that a large lens which is larger than former lens is used and the sizes of the magnets 6 are not reduced, the lens is difficult to be assembled in the shape which is the same as the existing shape structurally, and the bending parts 9a of the magnet 9 are difficult to be inserted between the recessed outside wall part 3e of the lens support 3 and the driving coil 4. Therefore, a structure that the bending parts 9a of the magnet 9 do not need to be inserted between the recessed outside wall part 3e and the driving coil 4 is disclosed (referring to Patent Literature 2: JP 4966750).

FIG. 22 to FIG. 25 are perspective views of a lens driving device using a large lens. Moreover, with reference to FIG. 16 to FIG. 21, the same components in FIG. 22 to FIG. 25 are referenced by identical reference numbers, and description of the identical reference numbers is omitted.

As shown in FIG. 22 to FIG. 25, in the lens driving device using a large lens, the intervals between the front end clamping parts 3a of the lens support 3 and the clamping parts 8a of the upper side fixing body 8 are set to be the maximum amounts of movement C, and the front end clamping parts 3a and the clamping parts 8a are utilized for limiting the lens support in the vertical direction.

The limitation in the plane direction is carried out by utilizing a cylindrical dividing wall 1f disposed at the central part of the lower side fixing body 1 and a flange part 3k disposed at the central part of the lens support 3 on the side opposite to the side of the object to be shot. The interval between the dividing wall 1f and the flange part 3k is set to be the maximum amount of movement E.

The limitation in the rotation direction is carried out by utilizing a plurality of clamping parts 1g arranged on the outside of the dividing wall 1f of the lower side fixing body 1 and a plurality of groove parts 2m arranged on the outside of the flange part 3k of the lens support 3. The intervals between the clamping parts 1g and the groove parts 3m are set to be the maximum amounts of rotation F. By utilizing the formed lens driving device, the amount of movement in the vertical direction, the amount of movement in the plane direction and the amount of rotation in the rotation direction of the lens support can be limited.

In addition, suppose the lens driving device mounted in the smart phone has various using methods (for example, the main body of the smart phone can be beat or swung repeatedly during the playing of games), and thus durability for resisting impact generated by low falling at the height of 5 cm to 15 cm (the falling relative to about 1.6 m is usually called low falling) in thousands to tens of thousands times is needed. In the existing lens driving device, the clamping parts of the clamping mechanisms in the vertical direction, the plane direction and the rotation direction are damaged slowly under the effect of impact, or micro deformation of the spring component occurs repeatedly under the effect of repeated impact force, and thus degradation easily occurs. Therefore, in the current lens driving device, countermeasures which do not interference with miniaturization and can improve the durability of the components for the repeated impact resistance needs to be researched.

BRIEF SUMMARY OF THE INVENTION

In view of the existing problems, the present invention aims to provide a lens driving device, which does not cause a large size or has no need to add components, and damage of components for limiting the amount of movement in all directions caused by impact can be alleviated, and the durability is easily improved.

The lens driving device of the present invention includes a lens support, a driving coil, an upper side fixing body, a lower side fixing body, an upper spring and a lower spring. The lens support is used for retaining a lens. A side of an object to be shot is taken as a front side of an optical axis of the lens. The driving coil is disposed on an outer side of the lens support and is configured for enabling the lens support to move along the optical axis. The upper side fixing body is disposed on the upper side of the lens support. The lower side fixing body is disposed on the lower side of the lens support. The upper spring is configured for connecting the lens support with the upper side fixing body and supporting the lens support to be capable of moving in the direction of the optical axis. The lower spring is used for connecting the lens support with the lower side fixing body and supporting the lens support to be capable of moving in the direction of the optical axis. The lens driving device is such configured that the lens support includes a plurality of protruding parts formed below the driving coil and protruding outwards from the lens support. A first clamping part is formed on the upper surface of each protruding part. A plurality of vertical direction limiting parts abutting with the first clamping parts so as to limit the amount of movement along the optical axis are arranged on the lower surface of the upper side fixing body. Under the condition that the driving coil is not driven, the first clamping parts of the lens support and the vertical direction limiting parts of the upper side fixing body are mutually partitioned at a preset interval.

In the present invention, the interval between the first clamping parts of the lens support and the vertical direction limiting parts of the upper side fixing body is set to be a preset interval (the maximum amount of movement in the vertical direction), and thus under the condition that the lens driving device is influenced by falling impact, components of existing vertical direction clamping mechanism abut mutually, meanwhile the first clamping parts abut against the vertical direction limiting parts mutually, so that the vertical impact generated along with the falling is diffused, and thus the damage of the clamping parts or the lens support caused by the impact can be alleviated, and the durability can be improved.

Moreover, as a preferable embodiment of the present invention, two second clamping parts are formed on the side faces of each protruding part of the lens support, a plurality of plane direction limiting parts for abutting against the second clamping parts and limiting the amount of movement in the direction orthogonal to the optical axis are arranged on the lower side fixing body, and under the condition that the driving coil is not driven, the second clamping parts of the lens support and the plane direction limiting parts of the lower side fixing body are mutually partitioned at a preset interval.

In the present invention, the interval between the second clamping parts of the lens support and the plane direction limiting parts of the lower side fixing body is set to be a preset interval (the maximum amount of movement in the plane direction), and thus under the impact due to falling, components of the existing plane direction clamping mechanism abut mutually, meanwhile the second clamping parts abut against the plane direction limiting parts mutually, so that the plane impact generated with the falling is diffused, and thus the damage of the clamping parts or the lens support caused by the impact can be alleviated, and the durability can be improved.

Moreover, as a preferable embodiment of the present invention, a plurality of third clamping parts are formed at the front ends of the protruding parts of the lens support, a plurality of rotation direction limiting parts for abutting against the third clamping parts and limiting the amount of movement around the optical axis are arranged on the lower side fixing body, and under the condition that the driving coil is not driven, the third clamping parts of the lens support and the rotation direction limiting parts of the lower side fixing body are mutually partitioned at a preset interval.

In the present invention, the interval between the third clamping part of the lens support and the rotation direction limiting part of the lower side fixing body is set to be a preset interval (the maximum amount of movement in the rotation direction), and thus under the impact due to falling, components of the existing rotation direction clamping mechanism abut mutually, meanwhile the third clamping parts abut against the rotation direction limiting parts, so that the plane impact generated along with the falling is diffused, and thus damage or dents of the lens support caused by the impact can be alleviated, and garbage caused by friction is reduced.

Moreover, as a preferable embodiment of the present invention, at least two or more than two first clamping parts, two or more than two second clamping parts and two or more than two third clamping parts are respectively arranged on the lens support.

In the present invention, a plurality of clamping parts and limiting parts are arranged in the lens driving device, and the clamping parts abut against the limiting parts mutually by controlling the limiting parts so as to diffuse the impact, and thus the damage to the clamping parts and the limiting parts can be alleviated.

Moreover, the summary of the invention does not list all features required by the present invention, and auxiliary combination of these features can also become the present invention.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

Hereinafter, the embodiments of the lens driving device will be further described in detail with reference of the attached drawings and the specific embodiments. The following embodiments do not intend to confine the present invention relevant to the scope of claims, and all combinations of the features described in the embodiments are not necessarily included in the solutions of the present invention.

Figure 1:
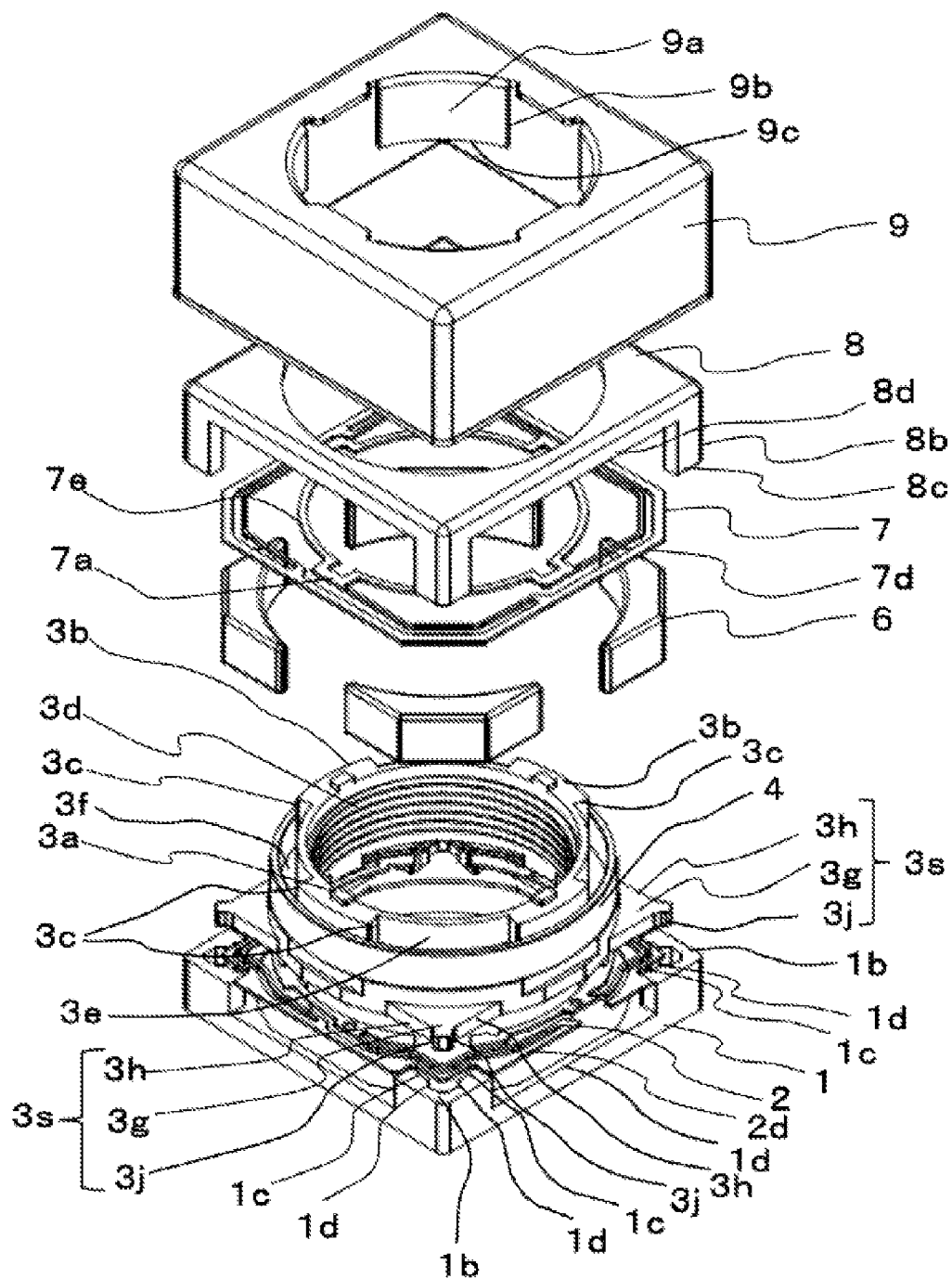
FIG. 1 is an exploded view of a lens driving device in according to a first embodiment of the present invention.
Figure 2:
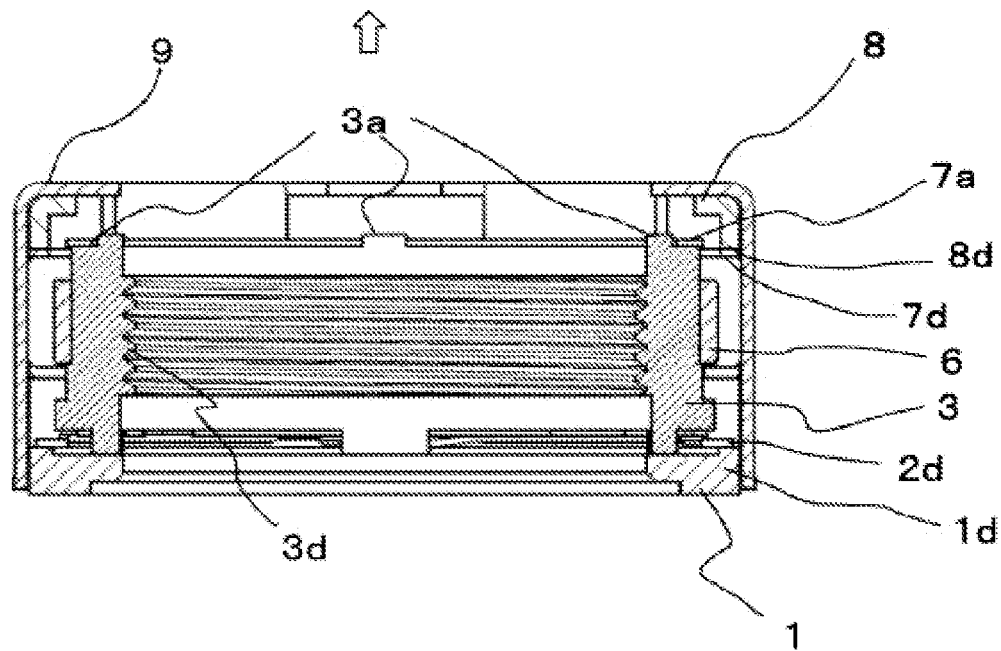
FIG. 2 is a longitudinal section view of the lens driving device.
Figure 3:
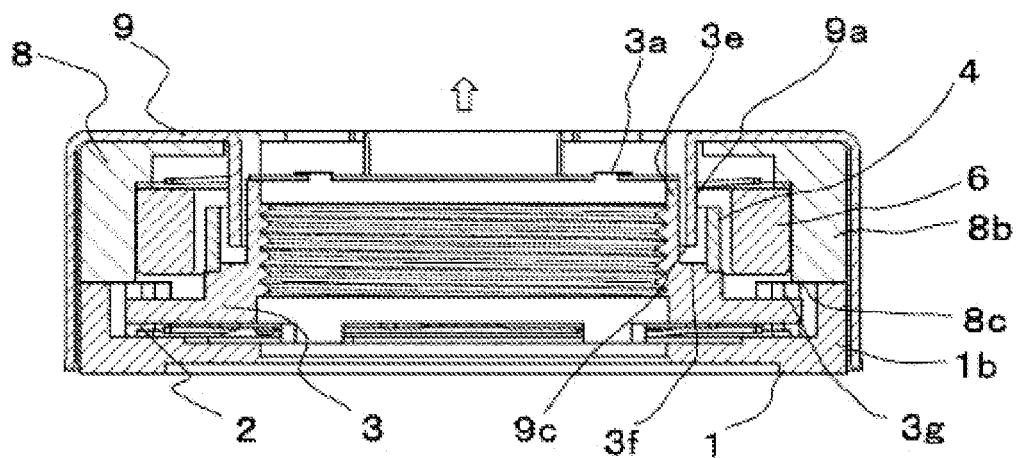
FIG. 3 is a longitudinal section view of the lens driving device along a line different from that in FIG. 2.

FIG. 1 is an exploded view of a part of a lens driving device of the present invention. In addition, in the specification, a side of an object to be shot is taken as the front side of the Z axis (optical axis) or +Z direction, and two directions orthogonal to the Z axis are respectively taken as a X axis direction and a Y axis direction.

The lens driving device in the embodiment includes: a lens support 3, a driving coil 4, a lower side fixing body 1, an upper side fixing body 8, a lower spring 2, an upper spring 7, a magnet yoke 9 and a plurality of magnets 6. The lens support 3 is used for retaining a lens unshown in figures, and a thread part 3d is formed on the lens support 3. The driving coil 4 is mounted on the lens support 3 and is used for enabling the lens support 3 to move upwards and downwards along the optical axis. The lower side fixing body 1 is disposed on the outer side (at a lower part of an outer circumference side) of the lens support 3. The upper side fixing body 8 is disposed on the outer side (at an upper part of the outer circumference side) of the lens support 3. The lower spring 2 is configured for connecting the lens support 3 and the lower side fixing body 1 from a side (lower side), opposite to the side of the object to be shot, of the lens. The upper spring 7 is used for connecting the lens support 3 and the upper side fixing body 8 from an upper side of the lens close to the object to be shot. The magnet yoke 9 is formed into a square shape as an outer metal cover and is mounted around the lens support 3 and is formed by magnetic substances such as soft magnet. The magnets 6 are mounted on the magnet yoke 9, and the outer circumference shapes of the magnets are shaped to adapt to the shape of the inner wall of the magnet yoke 9, and the inner circumference shapes of the magnets are shaped to adapt the shape of the outer circumference of the driving coil 4.

The upper spring 7 is mounted at the upper part of the lens support 3, and is used for connecting the lens support 3 with the upper side fixing body 8. The upper spring 7 is used for supporting the lens support 3 to be capable of moving along the optical axis direction. The lower spring 2 is mounted at the lower part of the lens support 3, and is used for connecting the lens support 3 with the lower side fixing body 1. The lower spring 2 is used for supporting the lens support 3 to be capable of moving along the optical axis direction.

An outline part 2d of the lower spring 2 is shaped to correspond to the shape of a plate spring outline retaining part d in the lower fixing body 1, and is mounted on the lower fixing body 1. An outline part 7d of the upper spring 7 is shaped to correspond to the shape of a plate spring outline retaining part 8d of the upper side fixing body 8 mounted in the magnet yoke 9, and the upper spring 7 is mounted on the upper side fixing body 8. A plurality of guiding parts 7a of the upper spring 7 are engaged with a plurality of front end clamping parts 3a of the lens support 3, and are used for determining the rotation direction of the lens support 3. An inner ring part 7e of the upper spring 7 is shaped to adapt the shape of the upper surface of the lens support 3.

The driving coil 4 is disposed on the outer side of the lens support 3 in radial direction, namely more closer to the inner side of the radial direction than the magnets 6, and is disposed in a magnetic field distributing radially and generated by the magnet yoke 9 and the magnets 6. With the electrification to the driving coil 4, the driving coil 4 generates a Lorentz force towards the direction (vertical direction) of the object to be shot. The driving coil 4 moves the lens support 3 to a preset position balanced with restoring force of the upper spring 7 and the lower spring 2 by utilizing the generated Lorentz force.

Four magnets 6 are disposed between the outer circumference side of the driving coil 4 and the inner circumference side of the magnet yoke 9 in a manner of surrounding the lens support 3. The inner circumference surfaces, on the side of the lens support 3, of the magnets 6, are shaped to correspond to the surface of the outer circumference of the driving coil 4, and the outer circumference surfaces of the magnets 6 are shaped to correspond to the surface of the inner circumference of the magnet yoke 9. The magnets 6 enable the magnetic field to be generated inside the magnet yoke 9.

A plurality of bending parts 9a are arranged on the magnet yoke 9. The side faces 9b of the bending parts 9a abut against a plurality of clamping parts 3c of the guiding parts 3b protruding radially outward from the outer circumference of the lens support 3. The following clockwise and counterclockwise maximum amounts of rotation F (see FIG. 7) are formed between the side faces 9b of the bending parts 9a and the clamping parts 3c.

In addition, the lens support 3 includes: a clamping mechanism for limiting a maximum amount of movement of the lens support 3 in the vertical direction, a clamping mechanism for limiting a maximum amount of movement of the lens support 3 in the plane direction and a clamping mechanism for limiting a maximum amount of movement of the lens support 3 in the rotation direction.

As shown in FIG. 2 to FIG. 5, as a vertical direction clamping mechanism for limiting the amount of movement in the vertical direction, a plurality of clamping parts 3f of the lens support 3 are arranged near the mounting surface of the driving coil 4. The clamping parts 3f and the lower end face 9c of the magnet yoke 9 are used for limiting the maximum amount of movement of the lens in the vertical direction. When the lens driving device (driving coil 4) does not act, the lower end face 9c of the magnet yoke 9 and the clamping parts 3f of the lens support 3 are partitioned at an interval (maximum amount of movement) C. Relatively, along with the driving of the lens driving device (driving coil 4), the lower end face 9c of the magnet yoke 9 abuts against the clamping parts 3f of the lens support 3 when the magnet yoke 9 moves the interval (maximum amount of movement) C. That is to say, in the embodiment, the lower end face 9c of the magnet yoke 9 and the clamping parts 3f of the lens support 3 are taken as clamping mechanisms for limiting the maximum amount of movement of the lens support 3 in the vertical direction (direction of the optical axis).

Figure 6:
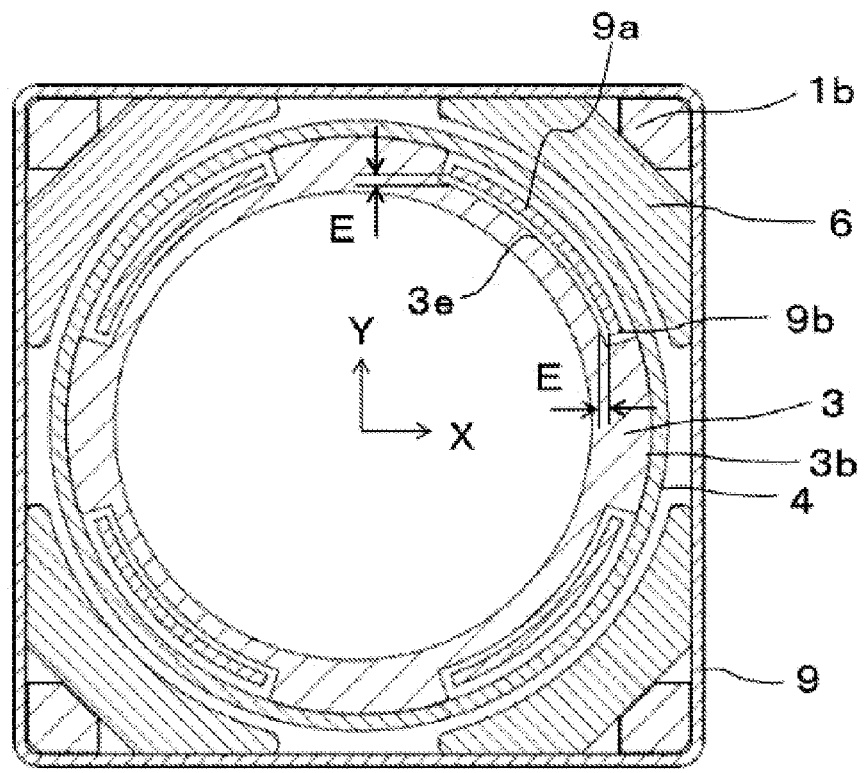
FIG. 6 is a transverse section view of the lens driving device.

As shown in FIG. 6, as the plane direction clamping mechanism for limiting the amount of movement in the plane direction, the maximum amount of movement of the lens along the plane direction is limited by the bending parts 9a of the magnet yoke 9 of the lens driving device and the recessed outside wall parts (clamping parts in side direction) 3e of the lens support 3. When the lens driving device (driving coil 4) does not act, the bending parts 9a of the magnet yoke 9 are such configured that the bending parts 9a of the magnet yoke 9 and the recessed outside wall parts (clamping parts in side direction) 3e of the lens support 3 are configured to be partitioned at an interval (maximum amount of movement) E. Relatively, along with the driving of the lens driving device (driving coil 4), the bending parts 9a of the magnet yoke 9 abut against the recessed outside wall parts 3e of the lens support 3 when the magnet yoke 9 moves the interval (maximum amount of movement) E.

That is to say, in the embodiment, the bending parts 9a of the magnet yoke 9 and the recessed outside wall parts 3e of the lens support 3 are taken as clamping mechanisms for limiting the maximum amount of movement of the lens support 3 in the plane direction (direction orthogonal to the direction of the optical axis).

In addition, in the embodiment, a cylindrical dividing wall raised up from the lower side fixing body 1 towards the side of the object to be shot is formed on the lower side fixing body 1, and a flange part which protrudes from the lower part of the lens support 3 towards the direction opposite to the side of the object to be shot is formed on the lens support 3. The cylindrical dividing wall and the flange part are arranged to face each other and abut against each other when the lens support 3 moves the interval (maximum amount of movement) E. That is to say, the dividing wall of the lower side fixing body 1 and the flange part of the lens support 3 can also be taken as clamping mechanisms for limiting the maximum amount of movement of the lens support 3 in the plane direction (direction orthogonal to the optical axis).

Figure 7:
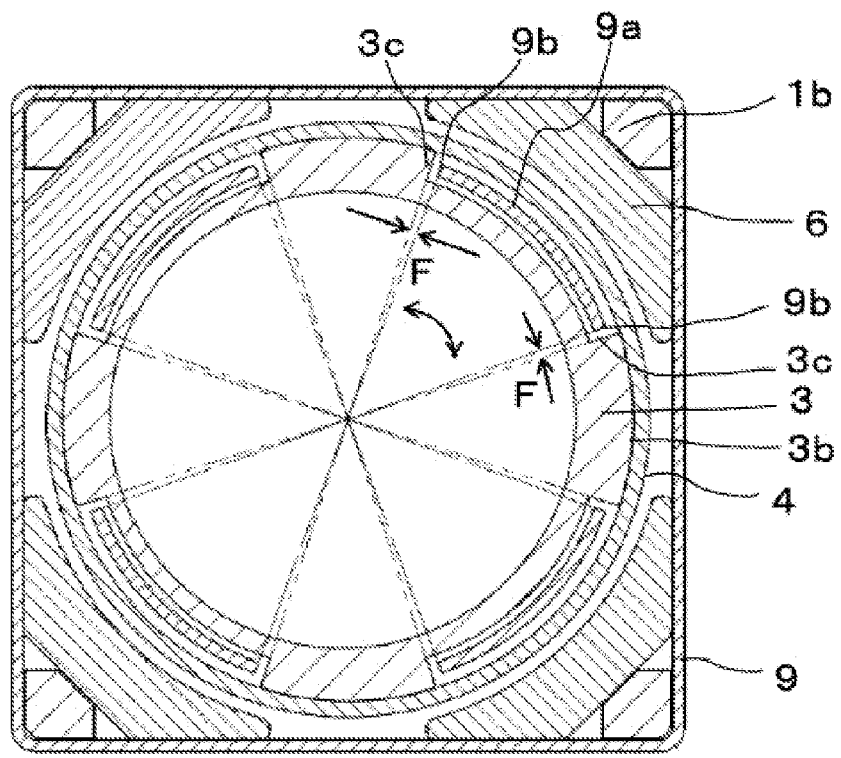
FIG. 7 is a transverse section view illustrating the rotation direction of the lens driving device.

As shown in FIG. 7, as the rotation direction clamping mechanism for limiting the amount of movement in the rotation direction, the side faces 9b of the magnet yoke 9 and the clamping parts 3c of the lens support 3 are used for limiting the maximum amount of movement along the plane direction. When the lens driving device (driving coil 4) does not act, the side faces 9b of the magnet yoke 9 and the clamping parts 3c of the lens support 3 are partitioned at an interval (maximum amount of movement) F. Relatively, along with the driving of the lens supporting device (driving coil 4), the side faces 9b of the magnet yoke 9 abut against the clamping parts 3c of the lens support 3 when the side faces 9b of the magnet yoke 9 moves the interval (maximum amount of movement) F.

That is to say, in the embodiment, the side faces 9b of the magnet yoke 9 and the clamping parts 3f of the lens support 3 are taken as the clamping mechanisms for limiting the maximum amount of movement of the lens support 3 in the rotation direction (around the direction of the optical axis).

In addition, in the embodiment, under the condition that the dividing wall is formed on the lower side fixing body 1 and the flange part is formed on the lens support 3, a plurality of clamping parts can also be formed on the side faces of the dividing wall further, and a plurality of groove parts abutting against the clamping parts are formed on the side faces of the flange parts. That is to say, the clamping parts of the lower side fixing body 1 and the groove parts of the lens support 3 can also be taken as the clamping mechanisms for limiting the maximum amount of movement of the lens support 3 in the rotation direction (around the direction of the optical axis).

Then, referring to FIG. 1 to FIG. 11, several new clamping mechanisms in the vertical direction, the plane direction and the rotation direction as characteristic structures of the present invention are described.

As shown in FIG. 1, a plurality of protruding parts 3s protrudes radially outwards from the outer circumference surface of the lens support 3. The protruding parts 3s are configured below the driving coil 4, and each is formed to be an approximately triangular protruding body extending towards a corresponding one of therefore corners of the lower side fixing body 1. A clamping part 3g as a first clamping part is formed on the upper surface of each protruding part 3s. Under the condition that the lens driving device is impacted in the vertical direction, the clamping parts 3g formed on the upper surfaces of the protruding parts abut against clamping parts 8c as limiting parts in the vertical direction described below.

Guiding parts 8b extending from the four corners of the upper side fixing body 8 along the −Z axis direction are formed on the upper side fixing body 8. The clamping parts 8c as limiting parts in the vertical direction (direction of the optical axis) are arranged at the lower ends of the guiding parts 8b in the Z axis direction. Under the condition that the lens driving device is impacted in the vertical direction, the clamping parts 8c abut against the clamping parts 3g, and thus the amount of movement in the vertical direction as the direction of the optical axis is limited.

Figure 4:
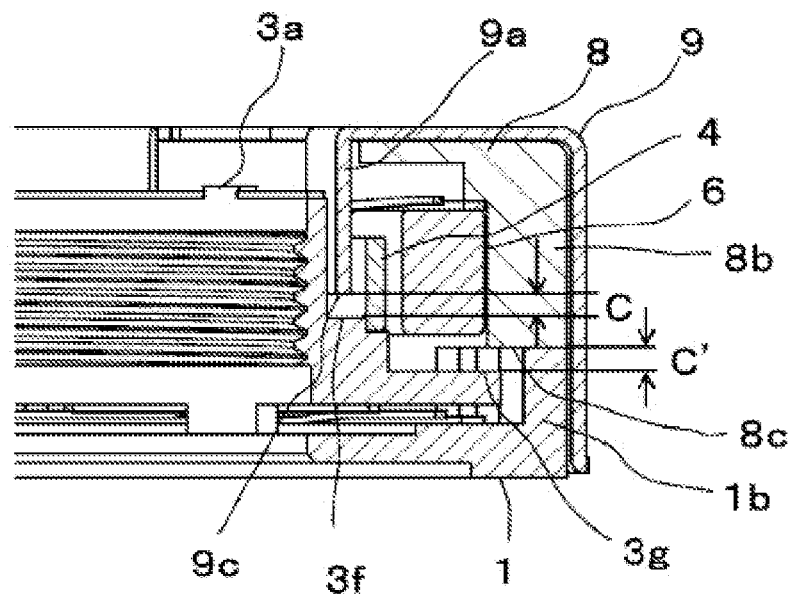
FIG. 4 is a partial enlarged view of FIG. 3.

In addition, under the condition that the driving coil 4 is not driven, an interval between the clamping part 3g of the lens support 3 and the clamping part 8c of the upper side fixing body 8 is the maximum amount of movement in the vertical direction. Namely, as shown in FIG. 4, under the condition that the lens driving device is not driven, an interval C' between the clamping part 3g of the lens support 3 and the clamping part 8c of the upper side fixing body 8 in the height direction is set to be equal to the interval (maximum amount of movement) C in the height direction between the clamping part 3f of the lens support 3 and the lower end face 9c of the magnet yoke 9.

Figure 5:
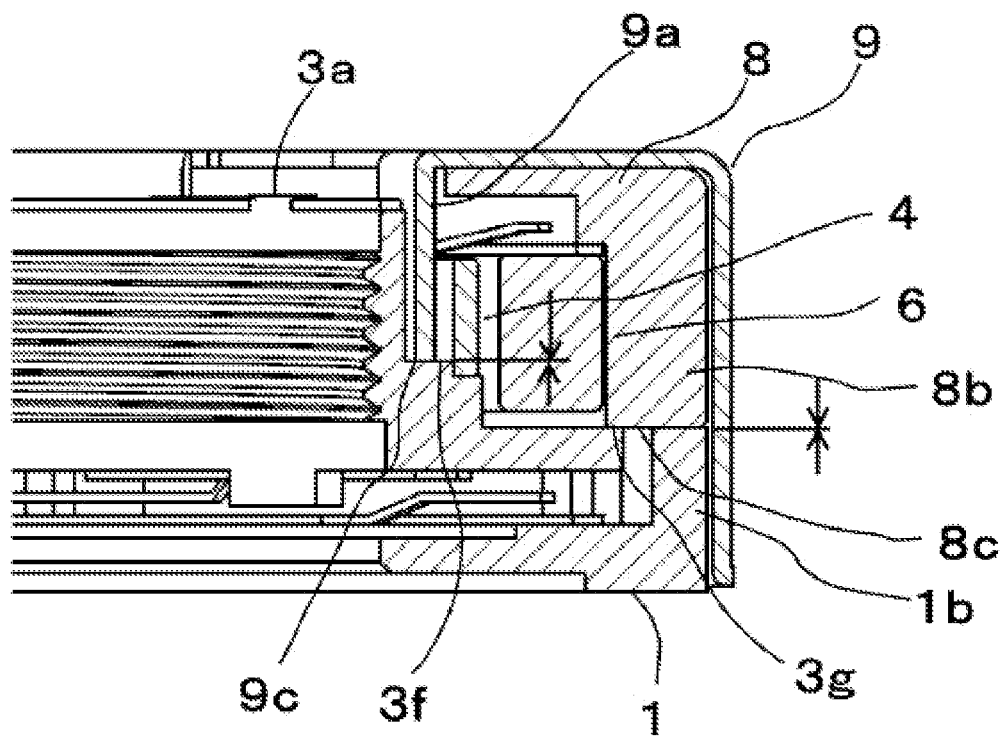
FIG. 5 is a detailed view of the lens support of FIG. 3 under the condition of moving upwards.

As shown in FIG. 5, under the condition that the lens driving device is impacted in the vertical direction, and the clamping parts 3f of the lens support abut against the lower end faces 9c of the magnet yoke 9, the clamping parts 3g of the lens support 3 abut against the clamping parts 8c of the guiding parts 8b in the upper side fixing body 8, thus the lens driving device stops driving.

Figure 8:
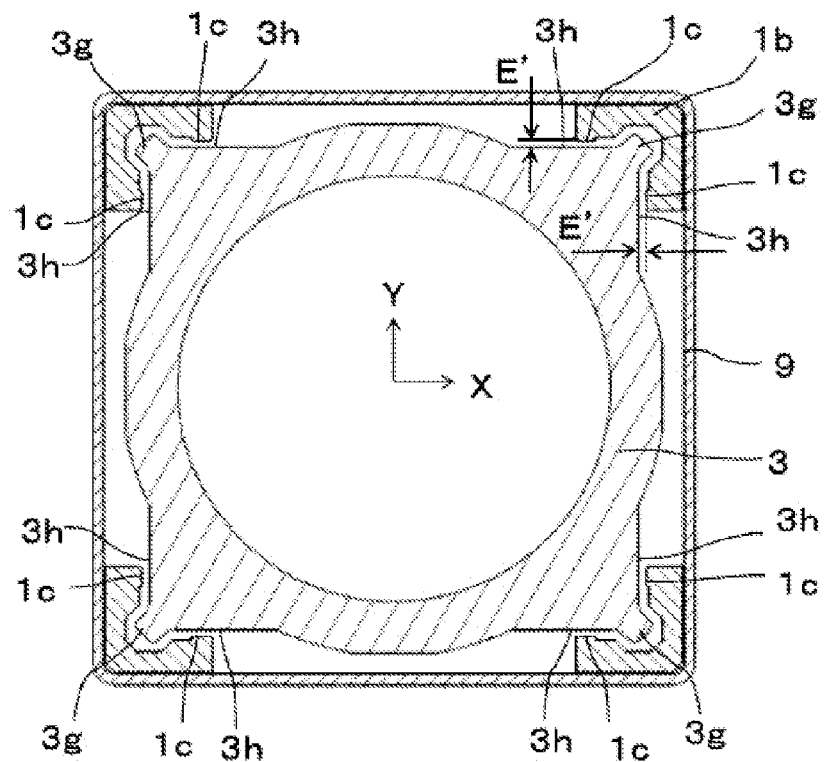
FIG. 8 is a transverse section view of the lens driving device along the position different from that in FIG. 6.

As shown in FIG. 8, a plurality of clamping parts 3h as second clamping parts different from the clamping parts 3g are arranged on the protruding parts 3s of the lens support 3. The clamping parts 3h of the lens support 3 are formed on the side faces of the protruding parts 3s, more specifically close to the side face of the lens support 3. The clamping parts 3h and a plurality of clamping parts 1c formed on the guiding parts 1b of the lower side fixing body 1 and taken as the limiting parts in the plane direction (direction orthogonal to the direction of the optical axis) are oppositely disposed. Under the condition that the lens driving device is impacted in the plane direction, the clamping parts 3g abut against the clamping parts 1c.

The guiding parts 1b respectively extending towards the X axis direction and the Y axis direction are formed on the lower side fixing body 1. The clamping parts 1c as the limiting parts in the plane direction are arranged at the ends of the guiding parts 1b in the X axis direction or the Y axis direction. Under the condition that the lens driving device is impacted in the plane direction, the clamping parts 1c abut against the clamping parts 3h, and thus the amount of movement in the plane direction orthogonal to the direction of the optical axis is limited.

In addition, under the condition that the driving coil 4 is not driven, an interval between the clamping part 3h of the lens support 3 and the clamping part 1c of the lower side fixing body 1 is the maximum amount of movement in the plane direction. Namely, as shown in FIG. 8, under the condition that the lens driving device is not driven, an interval (maximum amount of movement) E between the clamping part 3h and the clamping part 1c is set to be equal to the interval (maximum amount of movement) E between the bending part 9a of the magnet yoke 9 and the recessed outside wall part 3e of the lens support 3.

Figure 10:
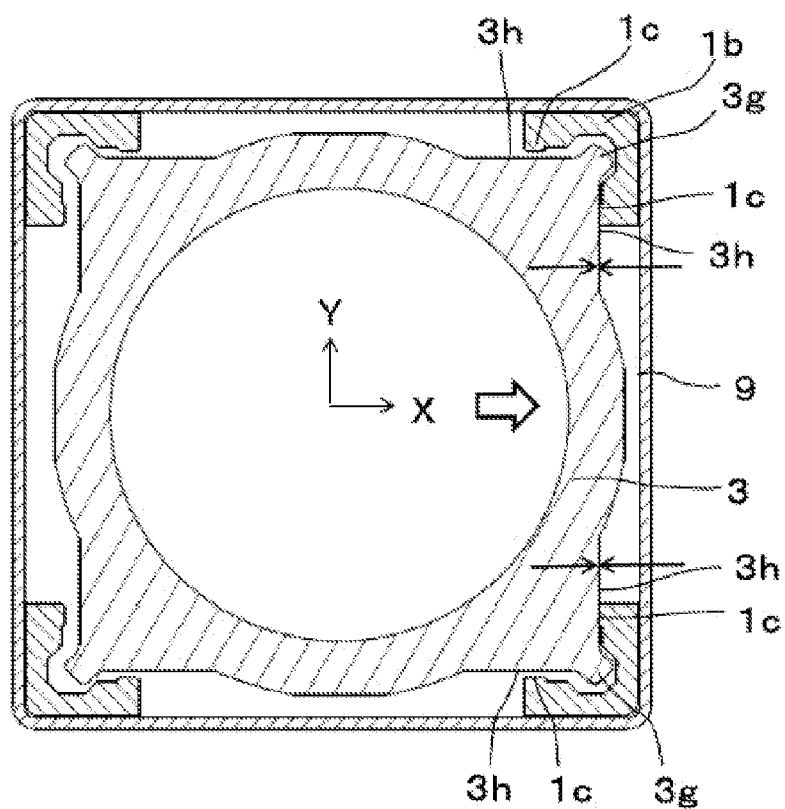
FIG. 10 is a transverse section view of the lens driving device when moving from the state in FIG. 6 towards the X axis direction.

As shown in FIG. 6 and FIG. 10, under the condition that the lens driving device is impacted in the X axis direction as the plane direction, the recessed outside wall parts 3e of the lens support 3 abut against the bending parts 9a of the magnet yoke 9, meanwhile the clamping parts 3h of the lens support 3 abut against the clamping parts 1c of the lower side fixing body 1, and thus the lens driving device stops driving.

Figure 9:
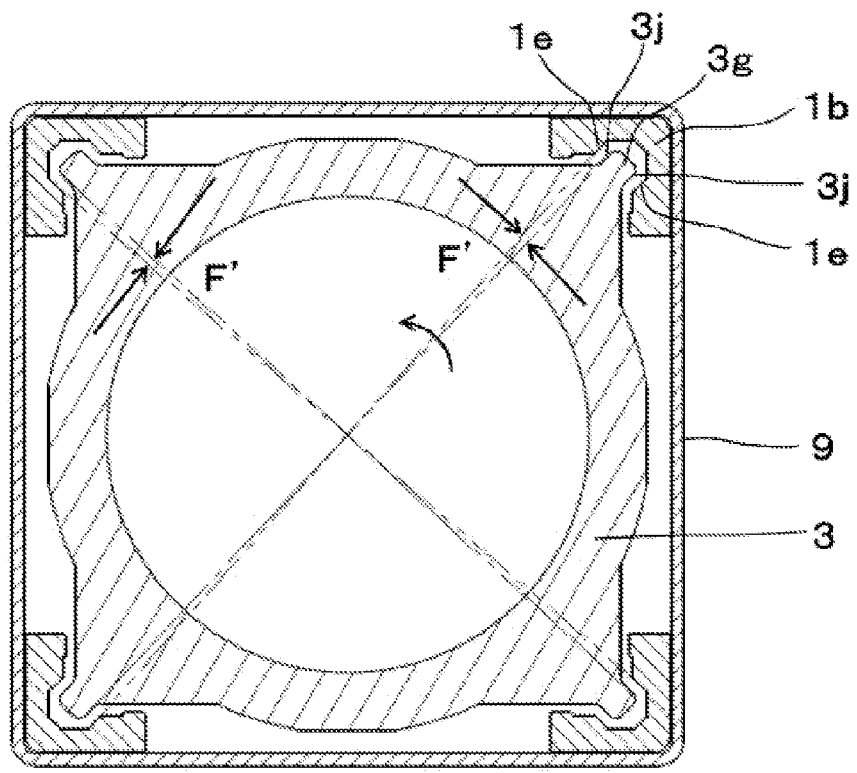
FIG. 9 is a transverse section view illustrating the rotation direction of the lens driving device.

As shown in FIG. 9, a plurality of clamping parts 3j as third clamping parts different from the clamping parts 3g and 3h are arranged on each protruding part 3s of the lens support 3. The clamping parts 3j of the lens support 3 are formed on the side face of the front end of the protruding part 3s. Specifically, the clamping parts 3j are formed at the position farther away from the lens support 3 relative to the clamping parts 3h in the plane direction. The clamping parts 3j and clamping parts 1e which are formed on the guiding part 1b of the lower side fixing body 1 and are taken as the limiting parts in the rotation direction (around the direction of the optical axis) are oppositely disposed. Under the condition that the lens driving device is impacted in the rotation direction, the clamping parts 3j abut against the clamping parts 1e.

The clamping parts 1e as the rotation direction limiting parts are arranged on the guiding parts 1b of the lower side fixing body 1. Under the condition that the lens driving device is impacted in the rotation direction, the clamping parts 1e abut against the clamping parts 3j, and thus the amount of movement in the rotation direction as the direction around the optical axis is limited.

In addition, under the condition that the driving coil 4 is not driven, an interval between the clamping part 3j of the lens support 3 and the clamping part 1e of the lower side fixing body 1 is the maximum amount of movement in the rotation direction. Namely, as shown in FIG. 9, under the condition that the lens driving device is not driven, an interval (maximum amount of movement) F' between the clamping part 3j and the clamping part 1e is set to be equal to the interval (maximum amount of movement) F between the side face 9b of the magnet yoke 9 and the clamping part 3c of the lens support 3.

Figure 11:
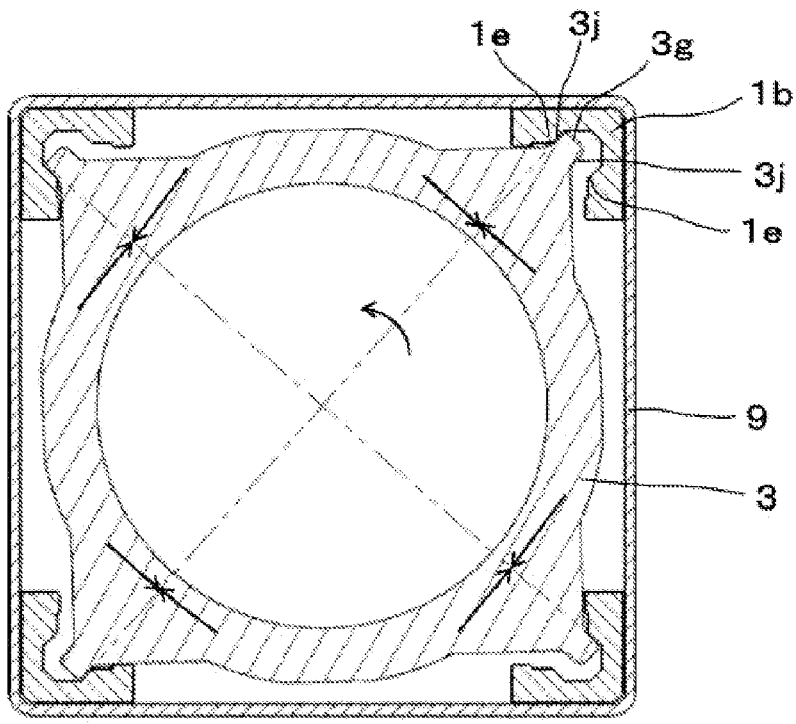
FIG. 11 is a transverse section view of the lens driving device when rotating counterclockwise beginning from the states in FIG. 8 and FIG. 9.

Under the condition that the lens driving device is impacted in the rotation direction anticlockwise around an arrow as shown FIG. 11, the clamping parts 3c of the lens support 3 as shown in FIG. 1 abut against the side faces 9b of the magnet yoke 9, meanwhile the clamping parts 3j of the lens support 3 as shown in FIG. 11 abut against the clamping parts 1e of the lower side fixing body 1, and thus the lens driving device is stopped.

In the lens driving device according to the above embodiment, the interval between the clamping part 3g of the lens support 3 and the clamping part 8c of the upper side fixing body 8 is taken as the maximum amount of movement in the vertical direction, the interval between the clamping part 3h of the lens support 3 and the clamping part 1c of the lower side fixing body is taken as the maximum amount of movement in the X axis direction and the Y axis direction, and the interval between the clamping part 3j of the lens support 3 and the clamping part 1e of the lower side fixing body 1 is taken as the maximum amount of movement in the rotation direction, thus under the condition that even if the lens driving device is impacted in the vertical direction, the plane direction and the rotation direction, the damage to each clamping part can also be alleviated. In addition, the lens driving device of the embodiment does not need to change shape such as increase the wall thickness of the clamping part 8a, the bending part 9a and the lens support 3, and the durability of impact caused by the increase of lens weight or repeated falling impact can also be improved.

Therefore, besides the existing clamping mechanisms, the lens driving device do not need to add components, the damage of the clamping parts 3g, 3h, 3j and the clamping parts 8c, 1c, 1e in all directions can also be reduced, and the durability of impact can also be improved. In addition, the lens driving device of the present invention can be provided not in a large size but to be compact.

In addition, in the lens driving device of the embodiment, the clamping parts 3g, 3h, 3j are arranged at the four parts of the lens support 3, but are not limited to this, and the clamping parts 3g, 3h, 3j can also be arranged respectively on more than two parts of the lens support 3 according to the durability of the clamping parts 3g, 3h, 3j.

In addition, in the lens driving device of the embodiment, the clamping parts 3f and the lower end faces 9c as the vertical direction clamping mechanisms, the bending parts 9a and the recessed outside wall parts 3e as the plane direction clamping mechanisms, the side faces 9b and the clamping parts 3c as the rotation direction clamping mechanisms can be omitted according to the durability of the clamping parts 3g, 3h, 3j. Thus, the sizes of all parts of the lens driving device can be easily controlled without controlling the sizes of the omitted parts for forming the clamping mechanisms.

Figure 12:
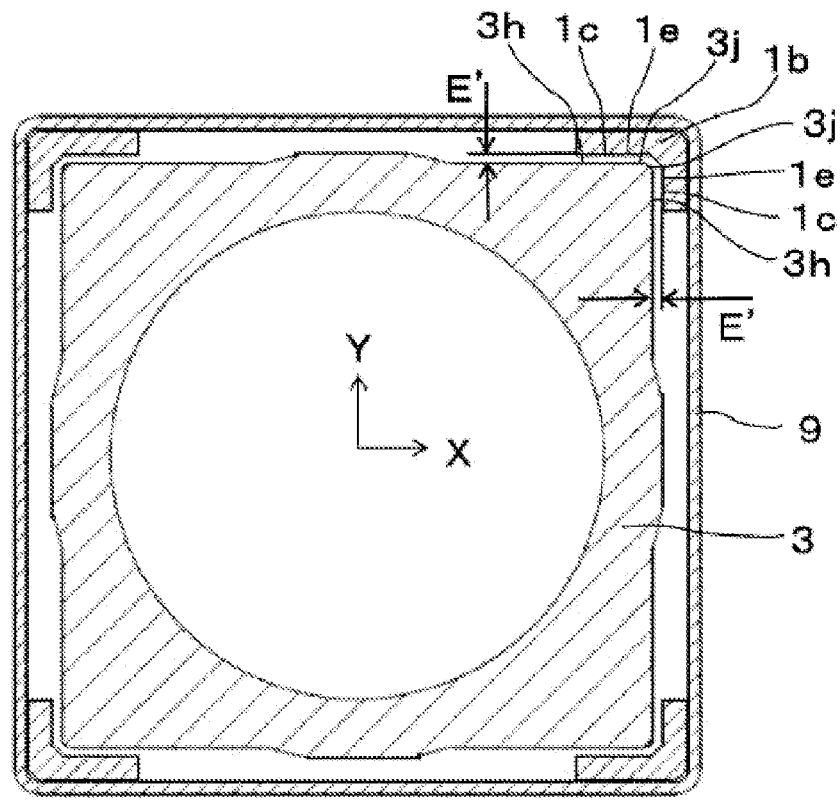
FIG. 12 is a transverse section view of a lens driving device in according to a second embodiment of the present invention.
Figure 13:
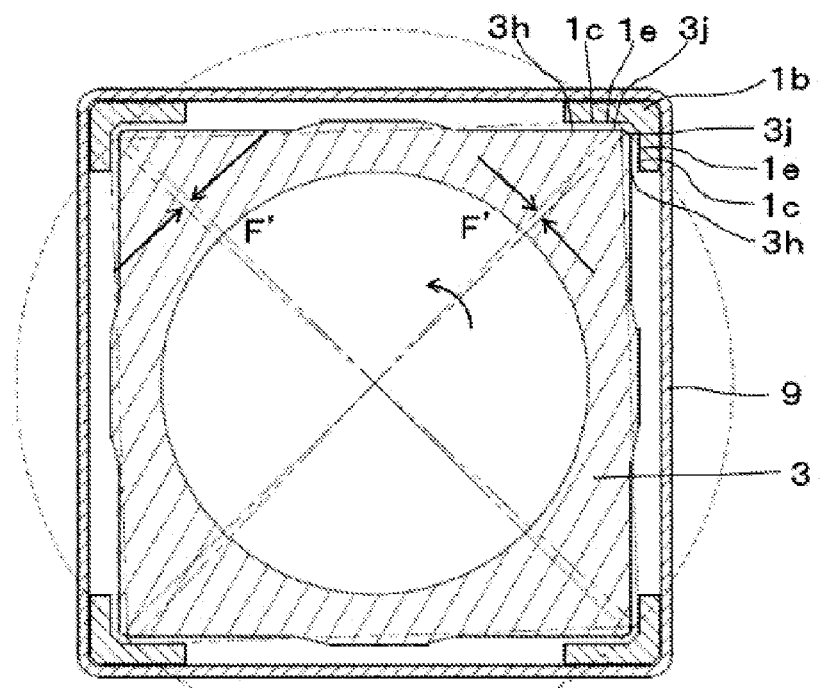
FIG. 13 is a transverse section view of the lens driving device illustrating the rotation direction of the lens driving device in according to the second embodiment.

FIG. 12 and FIG. 13 are section views of a second embodiment of the present invention. As shown in the figures, the clamping parts 3h and the clamping parts 3j, configured on the same side face of the lens support 3, for forming the protruding parts of the lens support 3 are different from that in the first embodiment. In the second embodiment, the effect the same as that in the first embodiment can also be realized.

Figure 14:
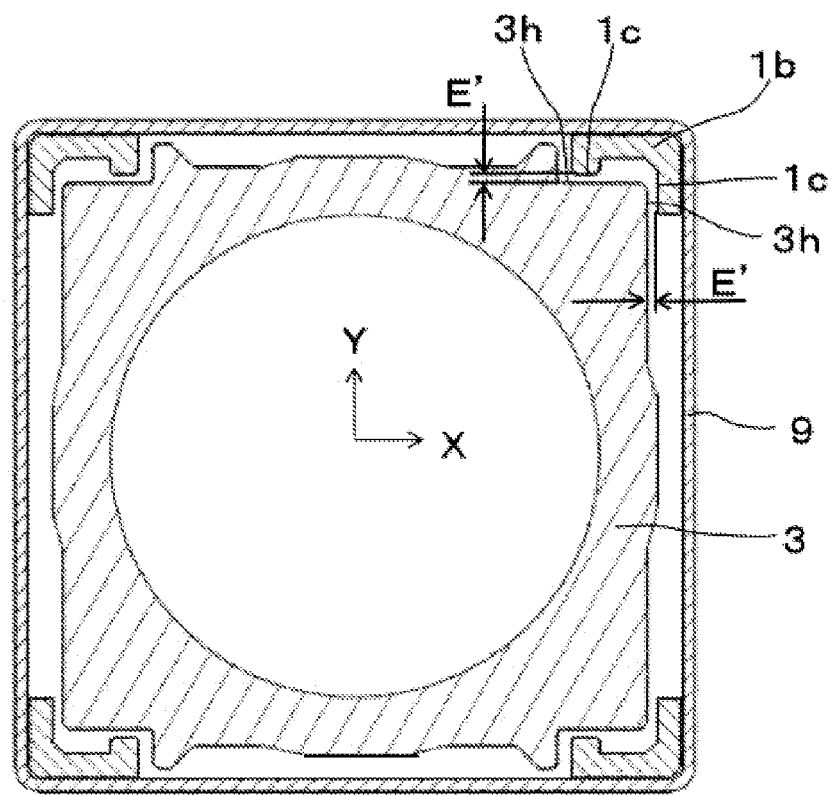
FIG. 14 is a transverse section view of a lens driving device in according to a third embodiment of the present invention.
Figure 15:
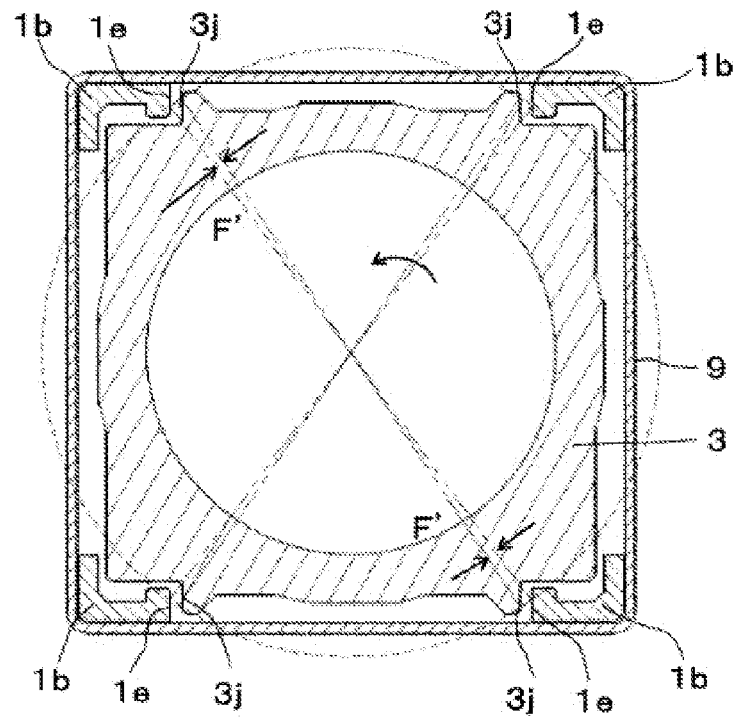
FIG. 15 is a transverse section view illustrating the rotation direction of the lens driving device in according to the third embodiment.
Figure 16:
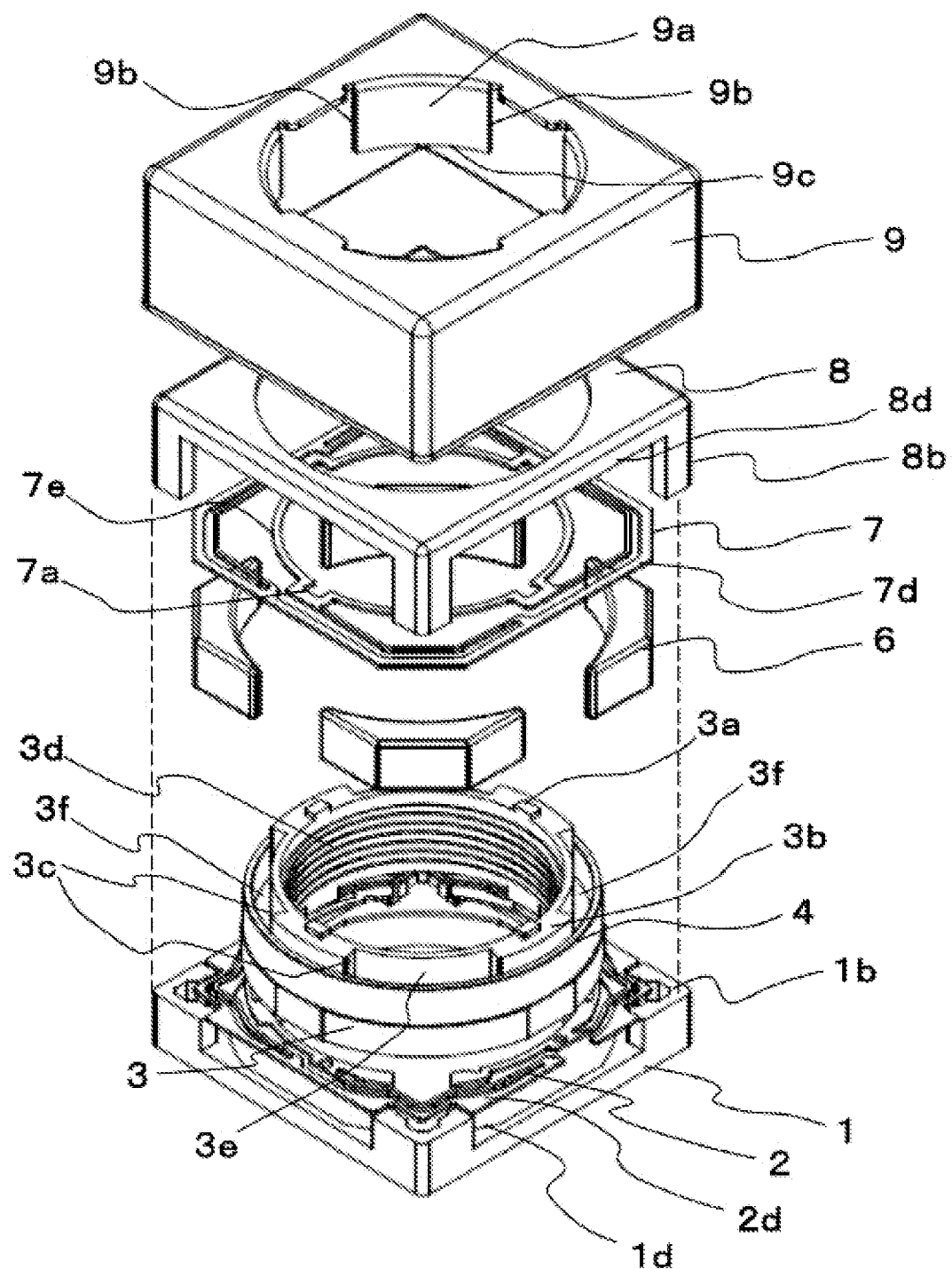
FIG. 16 is an exploded view of an existing lens driving device.
Figure 17:
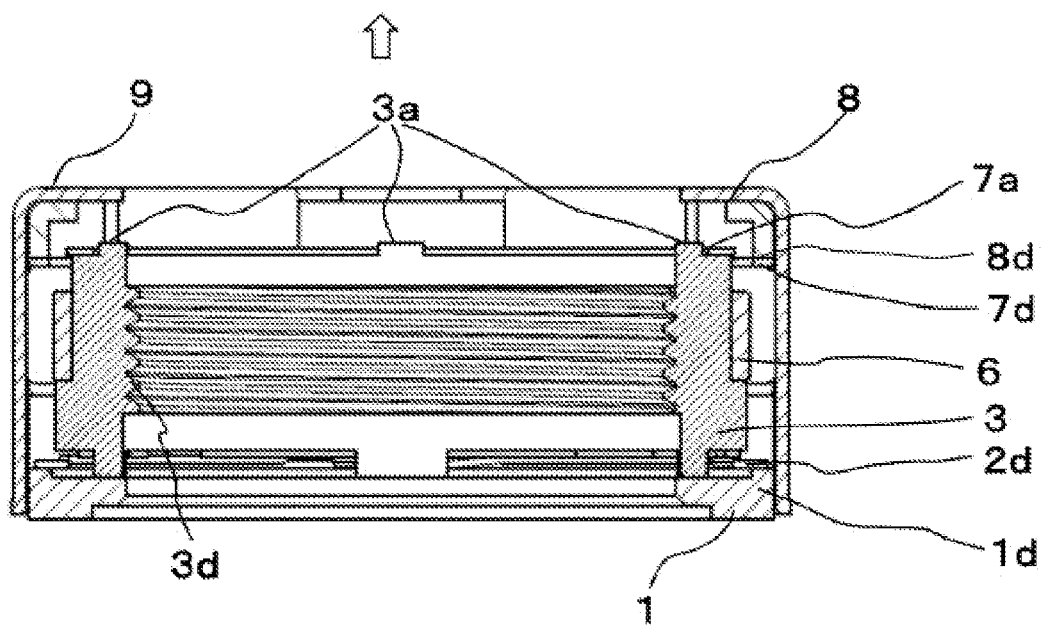
FIG. 17 is a longitudinal section view of the existing lens driving device as shown in FIG. 16.
Figure 18:
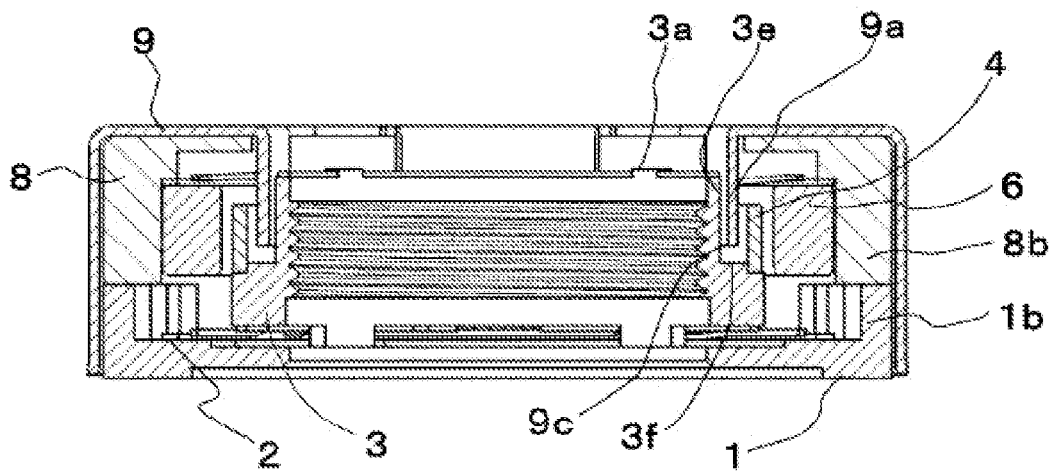
FIG. 18 is a longitudinal section view of the lens driving device along the position different from that in FIG. 17.
Figure 19:
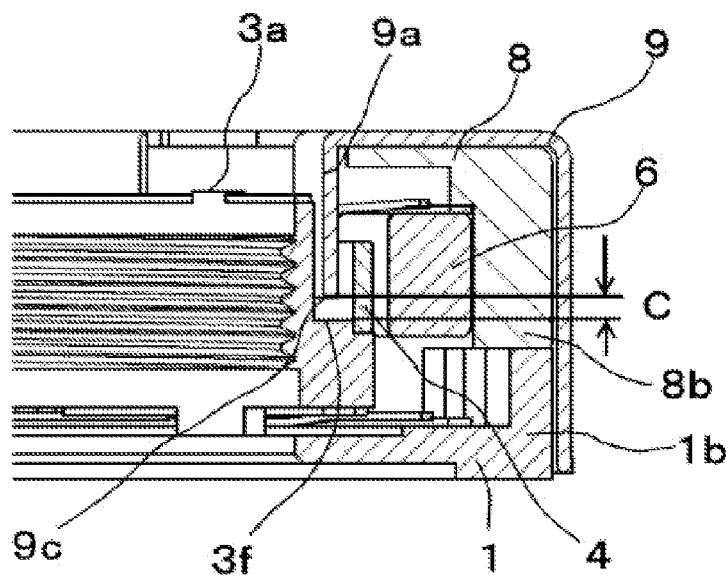
FIG. 19 is a partial detailed view of FIG. 18.
Figure 20:
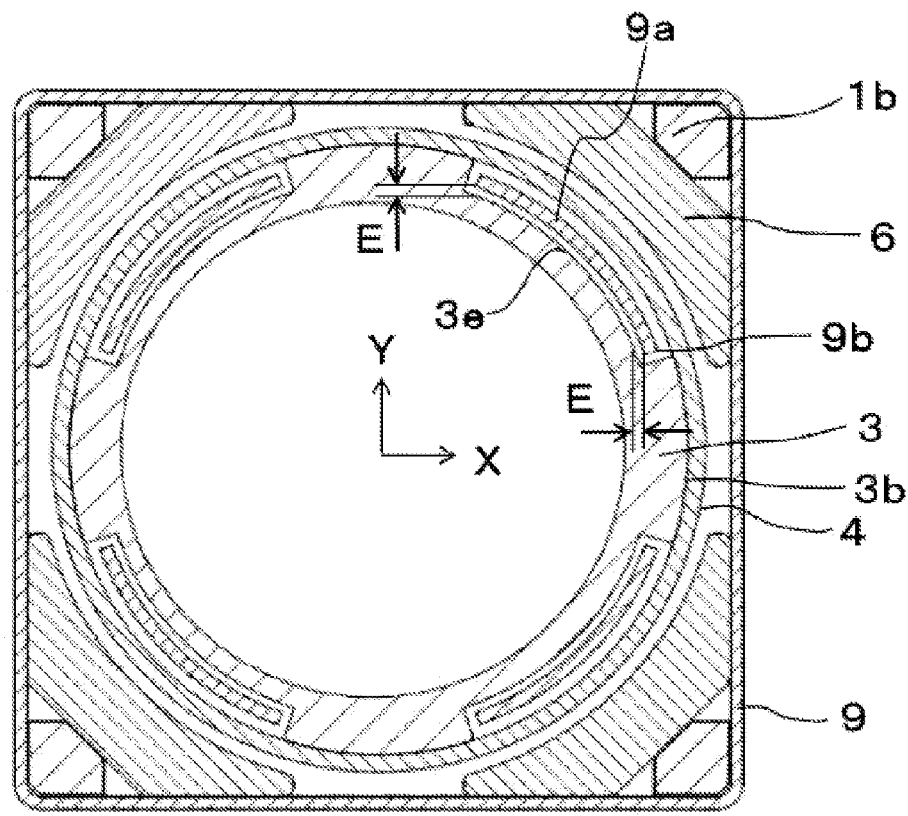
FIG. 20 is a transverse section view of the existing lens driving device as shown in FIG. 16.
Figure 21:
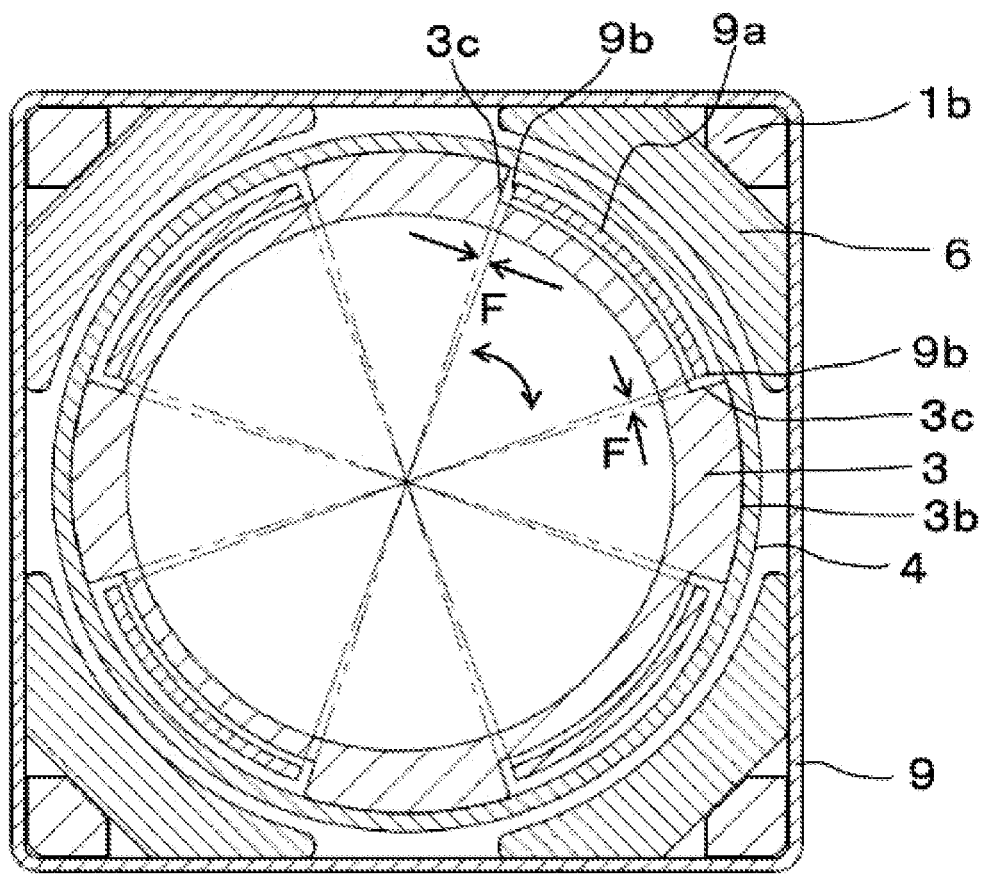
FIG. 21 is a transverse section view illustrating the rotation direction of the lens driving device as shown in FIG. 16.
Figure 22:
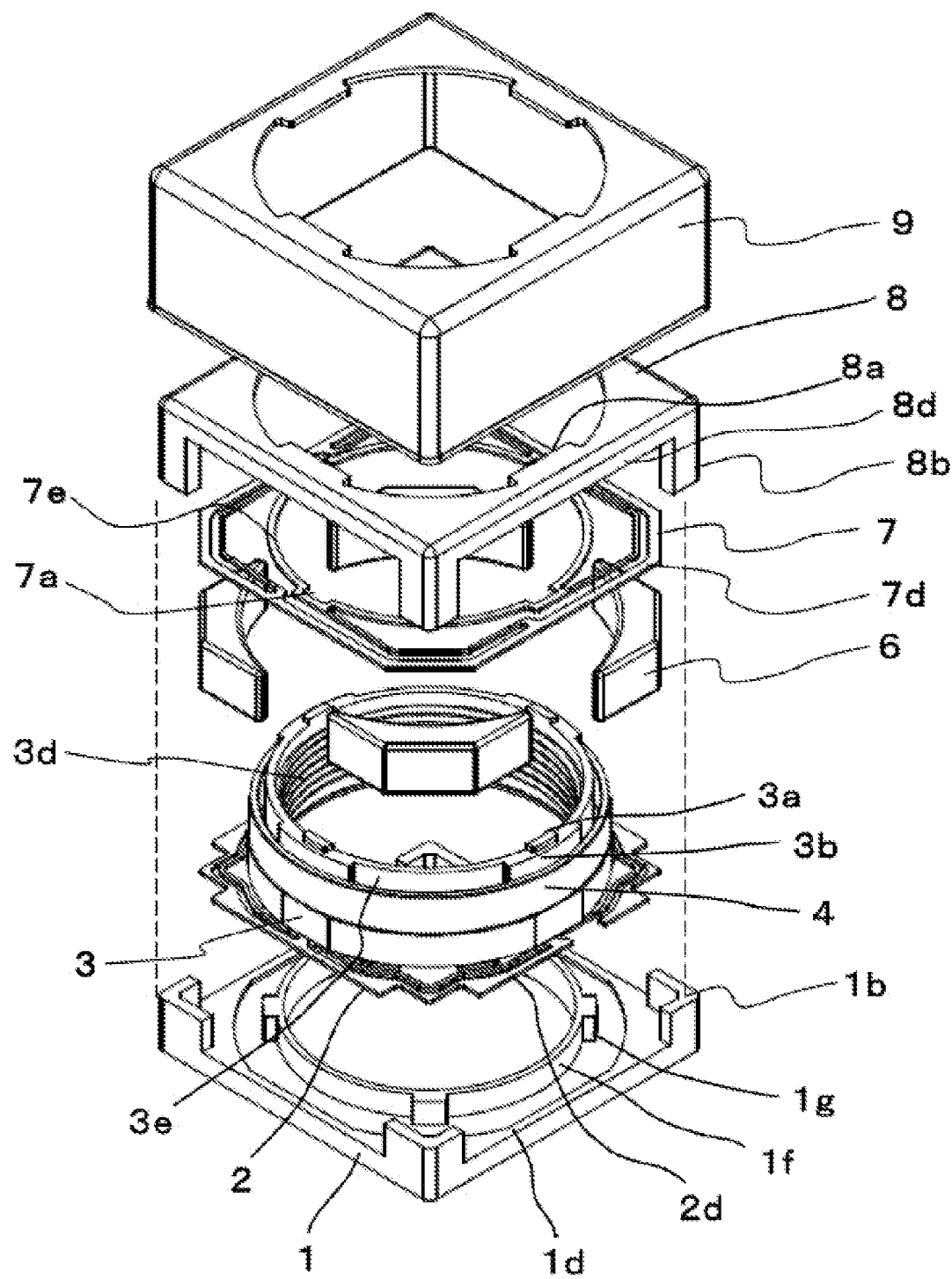
FIG. 22 is an exploded view of a lens driving device under the condition that the lens diameter becomes larger.
Figure 23:
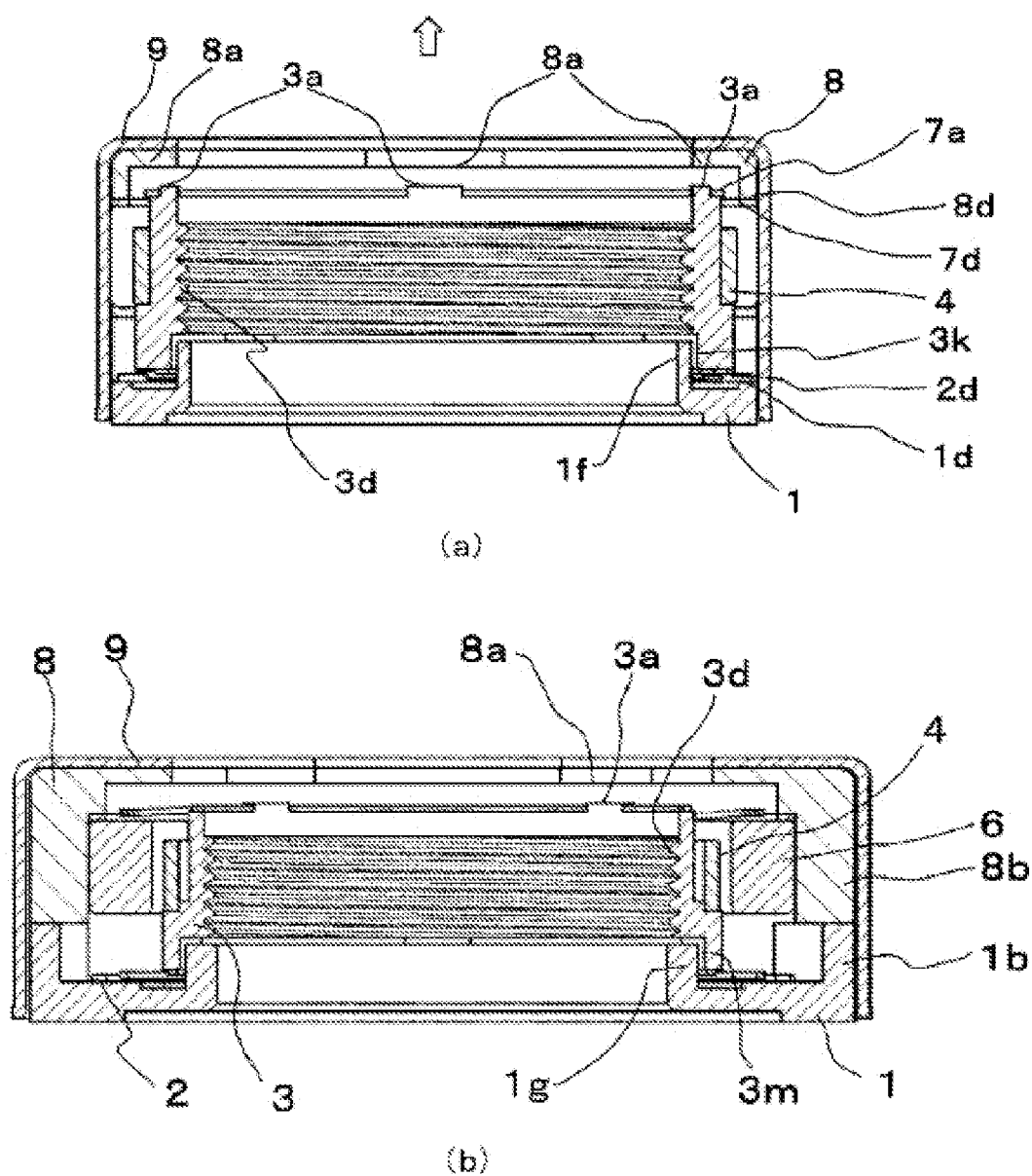
FIG. 23 is a longitudinal section view of the existing lens driving device as shown in FIG. 22.
Figure 24:
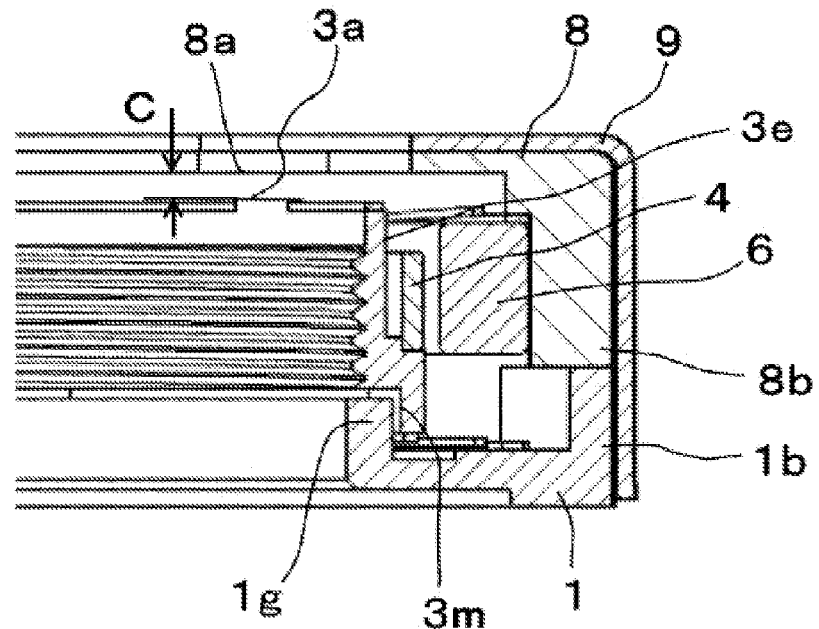
FIG. 24 is a longitudinal section view of the existing lens driving device along the position different from that in FIG. 23.
Figure 25:
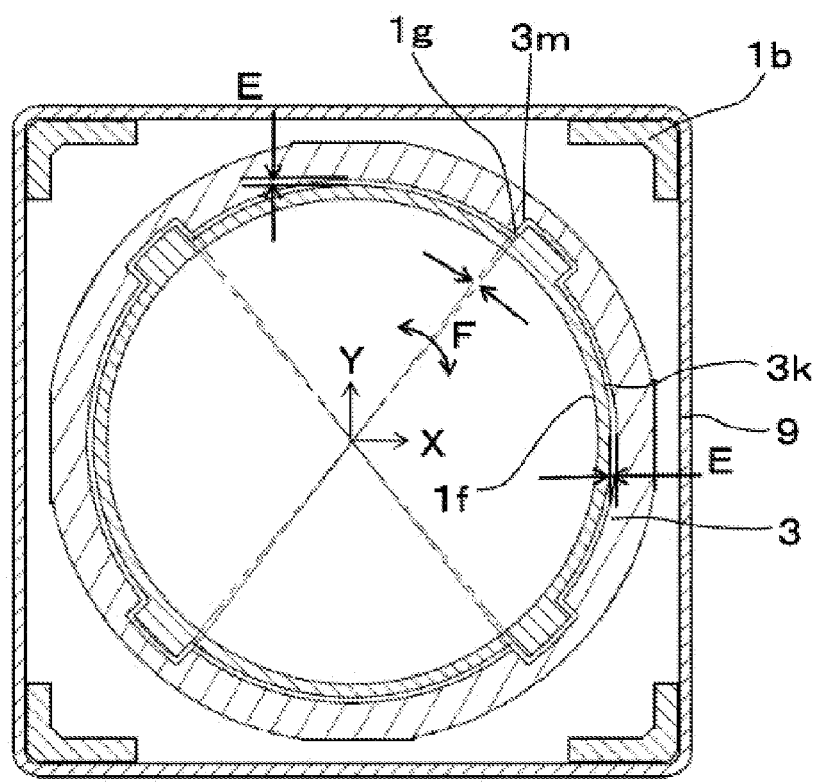
FIG. 25 is a transverse section view of the existing lens driving device as shown in FIG. 22.

FIG. 14 and FIG. 15 are section views of a third embodiment. As shown in the figures, the clamping parts 3h of the lens support are offset slightly towards the central direction away from four corners, and the clamping parts 3h are clamped by the clamping part 1c and the clamping part 1e only in the direction of the Y axis. In the third embodiment, during rotation movement in clockwise, the clamping parts 1e and 3j abut against each other, and the clamping part 1e and 3j abut against each other through counterclockwise rotation.

The embodiments are described above, but the technology scope of the present invention is not limited to the scope recorded in the embodiments. A person skilled in the art can know that it is obvious that the embodiments are changed or improved variously. According to the claims, it is obvious that the changed or improved embodiments also can be included in the technical scope of the present invention.

What is claimed is:

1. A lens driving device, comprising:
    a lens support for retaining a lens, a side of an object to be shot being taken as a front side of an optical axis of the lens;
    a driving coil configured on an outer side of the lens support and configured for enabling the lens support to move along the optical axis;
    an upper side fixing body configured above the lens support;
    a lower side fixing body configured below the lens support;
    an upper spring configured for connecting the lens support with the upper side fixing body and supporting the lens support to be capable of moving along the optical axis;
    a lower spring configured for connecting the lens support with the lower side fixing body and supporting the lens support to be capable of moving along the optical axis;
    wherein the lens support comprises a plurality of protruding parts formed below the driving coil and protruding outwards from the lens support;
    wherein an upper surface of each protruding part defines a first clamping part;
    wherein a plurality of vertical direction limiting parts are configured on a lower surface of the upper side fixing body, the plurality of vertical direction limiting parts abut against the plurality of first clamping parts so as to limit an amount of movement of the lens support along the optical axis;
    wherein under the condition that the driving coil is not driven, the plurality of first clamping parts of the lens support and the plurality of vertical direction limiting parts of the upper side fixing body are mutually partitioned at a preset interval.

2. The lens driving device according to claim 1, wherein two second clamping parts are formed on two side faces of each protruding part of the lens support;
    a plurality of plane direction limiting parts are configured on the lower side fixing body, and are configured for abutting against the corresponding second clamping parts and limiting an amount of movement of the lens support in the direction orthogonal to the optical axis;
    under the condition that the driving coil is not driven, the second clamping parts of the lens support and the plurality of plane direction limiting parts of the lower side fixing body are mutually partitioned at a preset interval.

3. The lens driving device according to any of claims 2, wherein two or more than two first clamping parts, two or more than two second clamping parts and two or more than two third clamping parts are respectively arranged on the lens support.

4. The lens driving device according to claim 2, wherein a plurality of third clamping parts are configured at the front ends of the plurality of protruding parts of the lens support;
    a plurality of rotation direction limiting parts for abutting against the plurality of third clamping parts and limiting an amount of movement of the lens support in the direction around the optical axis are configured on the lower side fixing body; and
    under the condition that the driving coil is not driven, the third clamping parts of the lens support and the rotation direction limiting parts of the lower side fixing body are mutually partitioned at a preset interval.

5. The lens driving device according to any of claims 4, wherein two or more than two first clamping parts, two or more than two second clamping parts and two or more than two third clamping parts are respectively arranged on the lens support.

6. The lens driving device according to claim 1, wherein a plurality of third clamping parts are configured at the front ends of the plurality of protruding parts of the lens support;
    a plurality of rotation direction limiting parts for abutting against the plurality of third clamping parts and limiting an amount of movement of the lens support in the direction around the optical axis are configured on the lower side fixing body; and
    under the condition that the driving coil is not driven, the third clamping parts of the lens support and the rotation direction limiting parts of the lower side fixing body are mutually partitioned at a preset interval.

7. The lens driving device according to any of claims 6, wherein two or more than two first clamping parts, two or more than two second clamping parts and two or more than two third clamping parts are respectively arranged on the lens support.

8. The lens driving device according to any of claims 1, wherein two or more than two first clamping parts, two or more than two second clamping parts and two or more than two third clamping parts are respectively arranged on the lens support.

* * * * *